United States Patent [19]
Sotheran et al.

[11] Patent Number: 6,034,674
[45] Date of Patent: Mar. 7, 2000

[54] BUFFER MANAGER

[75] Inventors: Martin William Sotheran, Dursley; Helen R. Finch, Bristol, both of United Kingdom

[73] Assignee: Discovision Associates, Irvine, Calif.

[21] Appl. No.: 08/876,720

[22] Filed: Jun. 16, 1997

Related U.S. Application Data

[63] Continuation of application No. 08/399,801, Mar. 7, 1995, abandoned, which is a continuation-in-part of application No. 08/400,397, Mar. 7, 1995, which is a continuation-in-part of application No. 08/382,958, Feb. 2, 1995, abandoned, which is a continuation of application No. 08/082,291, Jun. 24, 1993, abandoned.

[30] Foreign Application Priority Data

| Jun. 30, 1992 | [EP] | European Pat. Off. | 92306038 |
| Mar. 24, 1994 | [GB] | United Kingdom | 9405914 |
| Jul. 29, 1994 | [GB] | United Kingdom | 9415387 |
| Feb. 28, 1995 | [GB] | United Kingdom | 9503964 |

[51] Int. Cl.[7] .................................................. G09G 5/00
[52] U.S. Cl. ..................... 345/196; 345/508; 345/511; 345/516; 345/512; 345/419; 345/716; 382/236
[58] Field of Search ..................... 345/196, 197, 345/512, 511, 516, 508, 27–29; 348/419, 714–717; 358/524; 382/236; 395/164, 166, 250, 162, 152, 154

[56] References Cited

U.S. PATENT DOCUMENTS

| 4,107,780 | 8/1978 | Grimsdale et al. | 364/521 |
| 4,135,242 | 1/1979 | Ward et al. | 364/200 |
| 4,225,920 | 9/1980 | Stokes | 364/200 |
| 4,236,228 | 11/1980 | Nagashima et al. | 365/114 |
| 4,251,864 | 2/1981 | Kindell et al. | 364/200 |
| 4,302,776 | 11/1981 | Widergren et al. | 358/136 |
| 4,598,372 | 7/1986 | McRoberts | 364/518 |
| 4,617,657 | 10/1986 | Drynan et al. | 370/60 |

(List continued on next page.)

FOREIGN PATENT DOCUMENTS

| 0468480 | 1/1992 | European Pat. Off. | G11C 7/00 |
| 0572262 | 12/1993 | European Pat. Off. | H04N 7/133 |
| 0572263 | 12/1993 | European Pat. Off. | H04N 7/133 |
| 0576749 | 1/1994 | European Pat. Off. | G06F 9/38 |
| 576749A1 | 1/1994 | European Pat. Off. | G06F 9/38 |
| 0624983 | 11/1994 | European Pat. Off. | |
| 61-80940 | 4/1986 | Japan | H04M 9/00 |
| 2039106 | 7/1980 | United Kingdom | G06F 13/00 |
| 2171578 | 8/1986 | United Kingdom | H04L 5/00 |
| 2194085 | 2/1988 | United Kingdom | G06F 13/40 |
| 2268036 | 12/1993 | United Kingdom | H04L 12/18 |
| 9315586 | 8/1993 | WIPO | H04N 7/01 |
| 9524100 | 9/1995 | WIPO | H04N 7/01 |

OTHER PUBLICATIONS

Chong, Y.M.: "A Data–Flow Architecture for Digital Image Processing," Wescon '84 Conference Record, Anaheim, CA, USA, Oct. 30, 1984–Nov. 1, 1984, pp. 4.6.1–4.6.10.

Kinuhata, K. and Hideo Yamamoto. "Analysis of Field Correspondence and Field Memory Capacity in TV Standard Conversion." Electronics and Communications in Japan, Oct. 1974 USA vol. 57 No. 10 pp. 56–63 XP002047538.

Yamamoto, Hideo and K. Kinuhata. "Analysis of Field Correspondence and Field Memory Capacity in TV Standard Conversion." Abstracts—Transactions of the Institute of Electronics and Communications Engineers of Japan, vol. 57 No. 10 Oct. 1974 pp. 14–15 XP002047539.

*Primary Examiner*—Richard A. Hjerpe
*Assistant Examiner*—Kent Chang
*Attorney, Agent, or Firm*—Robert T. Braun; Donald Bollella; Clay E. Gaetje

[57] ABSTRACT

This invention provides a method to control the buffering of encoded video data organized as frames or fields. This method involves determining the picture number of each incoming decoded frame, determining the expected presentation number at any time and marking any buffer as ready when its picture number is on or after the presentation number.

16 Claims, 3 Drawing Sheets

6,034,674
Page 2

U.S. PATENT DOCUMENTS

| | | | |
|---|---|---|---|
| 4,630,198 | 12/1986 | Iyuan | 364/200 |
| 4,646,151 | 2/1987 | Welles, II et al. | 358/149 |
| 4,689,823 | 8/1987 | Wojcik et al. | 382/41 |
| 4,726,019 | 2/1988 | Adelmann et al. | 370/94 |
| 4,747,070 | 5/1988 | Trottier et al. | 364/900 |
| 4,799,056 | 1/1989 | Hattori et al. | 340/799 |
| 4,807,028 | 2/1989 | Hatori et al. | 358/133 |
| 4,814,978 | 3/1989 | Dennis | 364/200 |
| 4,823,201 | 4/1989 | Simon et al. | 358/133 |
| 4,866,637 | 9/1989 | Gonzalez-Lopez et al. | 364/518 |
| 4,875,196 | 10/1989 | Spaderna et al. | 365/238 |
| 4,887,224 | 12/1989 | Okano et al. | 364/518 |
| 4,891,784 | 1/1990 | Kato et al. | 364/900 |
| 4,903,018 | 2/1990 | Wiebach et al. | 341/51 |
| 4,910,683 | 3/1990 | Bishop et al. | 364/518 |
| 4,949,280 | 8/1990 | Littlefield | 364/518 |
| 4,985,766 | 1/1991 | Morrison et al. | |
| 4,991,112 | 2/1991 | Callemyn | 364/518 |
| 5,010,401 | 4/1991 | Murakami et al. | 358/136 |
| 5,021,947 | 6/1991 | Campbell et al. | 364/200 |
| 5,027,212 | 6/1991 | Marlton et al. | 358/183 |
| 5,035,624 | 7/1991 | Hosoya et al. | 434/309 |
| 5,036,475 | 7/1991 | Ueda | 364/518 |
| 5,038,209 | 8/1991 | Hang | 358/136 |
| 5,050,166 | 9/1991 | Cantoni et al. | 370/94.1 |
| 5,091,721 | 2/1992 | Hamori | 340/727 |
| 5,129,059 | 7/1992 | Hannah | 395/166 |
| 5,134,697 | 7/1992 | Scheffler | 395/425 |
| 5,148,524 | 9/1992 | Harlin et al. | 395/166 |
| 5,151,997 | 9/1992 | Bailey et al. | 345/200 |
| 5,161,221 | 11/1992 | Van Nostrand | 395/425 |
| 5,174,641 | 12/1992 | Lim | 348/427 |
| 5,179,372 | 1/1993 | West et al. | 340/799 |
| 5,182,642 | 1/1993 | Gersdorff et al. | 358/133 |
| 5,184,124 | 2/1993 | Molpus et al. | 341/50 |
| 5,200,925 | 4/1993 | Morooka | 365/219 |
| 5,221,966 | 6/1993 | Clayton et al. | 358/140 |
| 5,227,863 | 7/1993 | Bilbrey et al. | 348/578 |
| 5,229,863 | 7/1993 | Kao et al. | 358/426 |
| 5,233,545 | 8/1993 | Ho et al. | 364/569 |
| 5,233,690 | 8/1993 | Sherlock et al. | 395/165 |
| 5,241,222 | 8/1993 | Small et al. | 307/449 |
| 5,247,612 | 9/1993 | Quinard | 395/166 |
| 5,257,350 | 10/1993 | Howard et al. | 395/162 |
| 5,261,047 | 11/1993 | Rivshin | 395/163 |
| 5,263,136 | 11/1993 | DeAquiar et al. | 395/164 |
| 5,267,334 | 11/1993 | Normille et al. | 382/56 |
| 5,276,681 | 1/1994 | Tobagi et al. | 370/85.4 |
| 5,287,182 | 2/1994 | Haskell et al. | 348/500 |
| 5,287,193 | 2/1994 | Lin | 358/261.1 |
| 5,289,577 | 2/1994 | Gonzales et al. | 395/163 |
| 5,300,949 | 4/1994 | Rodriguez et al. | 345/202 |
| 5,301,242 | 4/1994 | Gonzales et al. | 382/56 |
| 5,303,342 | 4/1994 | Edge | 395/164 |
| 5,307,449 | 4/1994 | Kelley et al. | 395/119 |
| 5,311,309 | 5/1994 | Ersoz et al. | 348/409 |
| 5,319,460 | 6/1994 | Kubo | 348/715 |
| 5,321,806 | 6/1994 | Meinerth et al. | 395/162 |
| 5,341,371 | 8/1994 | Simpson | 370/85.4 |
| 5,343,218 | 8/1994 | Maeda | 345/116 |
| 5,351,047 | 9/1994 | Behlen | 341/67 |
| 5,357,606 | 10/1994 | Adams | 395/164 |
| 5,367,494 | 11/1994 | Shebanow et al. | 365/230.03 |
| 5,369,405 | 11/1994 | Choi et al. | 341/63 |
| 5,369,418 | 11/1994 | Richards | 345/185 |
| 5,384,598 | 1/1995 | Rodriguez et al. | 348/384 |
| 5,384,745 | 1/1995 | Konishi et al. | 365/230.03 |
| 5,386,537 | 1/1995 | Asano | 395/425 |
| 5,396,497 | 3/1995 | Veltman | 370/100.1 |
| 5,396,592 | 3/1995 | Fujimoto | 395/162 |
| 5,414,813 | 5/1995 | Shiobara | 395/200 |
| 5,420,801 | 5/1995 | Dockter et al. | 364/514 R |
| 5,421,028 | 5/1995 | Swanson | 395/800 |
| 5,426,606 | 6/1995 | Takai | 365/189.05 |
| 5,430,488 | 7/1995 | Hedley | 348/446 |
| 5,446,866 | 8/1995 | Drako et al. | 395/500 |
| 5,448,568 | 9/1995 | Delpuch et al. | 372/94.2 |
| 5,450,599 | 9/1995 | Horvath et al. | 395/800 |
| 5,452,006 | 9/1995 | Auld | 348/390 |
| 5,457,482 | 10/1995 | Rhoden et al. | 345/201 |
| 5,457,780 | 10/1995 | Shaw et al. | 395/165 |
| 5,461,679 | 10/1995 | Normile et al. | 395/650 |
| 5,467,137 | 11/1995 | Zdepski | 348/423 |
| 5,481,307 | 1/1996 | Goldstein et al. | 348/384 |
| 5,481,689 | 1/1996 | Stamm et al. | 395/412 |
| 5,495,291 | 2/1996 | Adams | 348/390 |
| 5,502,494 | 3/1996 | Auld | 348/426 |
| 5,502,573 | 3/1996 | Fujinami | 358/339 |
| 5,553,005 | 9/1996 | Voeten et al. | 364/514 |
| 5,572,691 | 11/1996 | Koudmani | 3995/405 |
| 5,574,933 | 11/1996 | Horst | 395/800 |
| 5,579,052 | 11/1996 | Artieri | 348/416 |

BUFFER MANAGER

REFERENCE TO RELATED APPLICATIONS

This application is related to British Patent Application entitled "Video Decompression" as U.K. Serial No. 9405914.4 filed on Mar. 24, 1994 and British Patent Application entitled "Method and Apparatus for Interfacing with RAM" as U.K. Serial No. (not yet known) filed on Feb. 28, 1995.

This application is a continuation of application Ser. No. 08/399,801, filed Mar. 7, 1995, now abandoned, which is a continuation-in-part of U.S. application Ser. No. 08/400,397 filed on Mar. 7, 1995, which is a continuation-in-part of U.S. application Ser. No. 08/382,958 filed on Feb. 2, 1995, now abandoned, which is a continuation of U.S. application Ser. No. 08/082,291 filed on Jun. 24, 1993 (now abandoned).

The following U.S. patent applications have subject matter related to this Application: application Ser. Nos. 08/382,958, filed Feb. 02, 1995; 08/400,397, filed Mar. 07, 1995; 08/399,851 filed Mar. 07, 1995; 08/482,296, filed Jun. 07, 1995; 08/486,396, filed Jun. 07, 1995; 08/484,730, filed Jun. 07, 1995; 08/479,279, filed Jun. 07, 1995; 08/483,020, filed Jun. 07, 1995; 08/487,224, filed Jun. 07, 1995; 08/400,722, filed Mar. 07, 1995; 08/400,723, filed Mar. 07, 1995; 08/404,067, filed Mar. 14, 1995; 08/567,555, filed Dec. 05, 1995; 08/396,834, filed Mar. 01, 1995; 08/473,813, filed Jun. 07, 1995; 08/484,456, filed Jun. 07, 1995; 08/476,814, filed Jun. 07, 1995; 08/481,561, filed Jun. 07, 1995; 08/482,381, filed Jun. 07, 1995; 08/479,910, filed Jun. 07, 1995; 08/475,729, filed Jun. 07, 1995; 08/484,578, filed Jun. 07, 1995; 08/473,615, filed Jun. 07, 1995; 08/487,356, filed Jun. 07, 1995; 08/487,134, filed Jun. 07, 1995; 08/481,772, filed Jun. 07, 1995; 08/481,785, filed Jun. 07, 1995; 08/486,908, filed Jun. 07, 1995; 08/486,034, filed Jun. 07, 1995; 08/487,740, filed Jun. 07, 1995; 08/488,348, filed Jun. 07, 1995; 08/484,170, filed Jun. 07, 1995; 08/516,038, filed Aug. 17, 1995; 08/399,810, filed Mar. 07, 1995; 08/400,201, filed Mar. 07, 1995 (now U.S. Pat. No. 5,603,012); 08/400,215, filed Mar. 07, 1995; 08/400,072, filed Mar. 07, 1995; 08/402,602, filed Mar. 07, 1995; 08/400,206, filed Mar. 07, 1995; 08/400,151, filed Mar. 07, 1995; 08/400,202, filed Mar. 07, 1995; 08/400,398, filed Mar. 07, 1995; 08/400,161, filed Mar. 07, 1995; 08/400,141, filed Mar. 07, 1995; 08/400,211, filed Mar. 07, 1995; 08/400,331, filed Mar. 07, 1995; 08/400,207, filed Mar. 07, 1995; 08/399,898, filed Mar. 07, 1995; 08/399,665, filed Mar. 07, 1995; 08/400,058, filed Mar. 07, 1995; 08/399,800, filed Mar. 07, 1995; 08/399,799, filed Mar. 07, 1995; 08/474,222, filed Jun. 07, 1995; 08/486,481, filed Jun. 07, 1995; 08/474,231, filed Jun. 07, 1995; 08/474,830, filed Jun. 07, 1995; 08/474,220, filed Jun. 07, 1995; 08/473,868, filed Jun. 07, 1995; 08/474,603, filed Jun. 07, 1995; 08/485,242, filed Jun. 07, 1995; 08/477,048, filed Jun. 07, 1995; and 08/485,744, filed Jun. 07, 1995.

BACKGROUND OF THE INVENTION

The present invention is directed to a decompression circuit which operates to decompress or decode a plurality of differently encoded input signals, and, more particularly, to a method of controlling the buffering of encoded video data in said circuit.

Previous buffer manager systems were hardwired to implement certain predetermined conversions, for example, 3-2 pulldown systems. The present buffer manager does not use a predefined sequence of replication or skipping of frames, as in conventional 3-2 pulldown systems, and thus any ratio of encoded frame rate and display frame rate can be accommodated. The present buffer manager is thus more flexible with respect to its strategy for dropping or duplicating frames in order to account for differences in the encoded data frame rate and the display frame rate.

SUMMARY OF THE INVENTION

The invention provides a method for buffering encoded video data organized as frames comprising determining the picture number of a frame, determining the desired presentation number of a frame and marking the buffer as ready when the picture number is on or after the desired presentation number.

Figure 1:
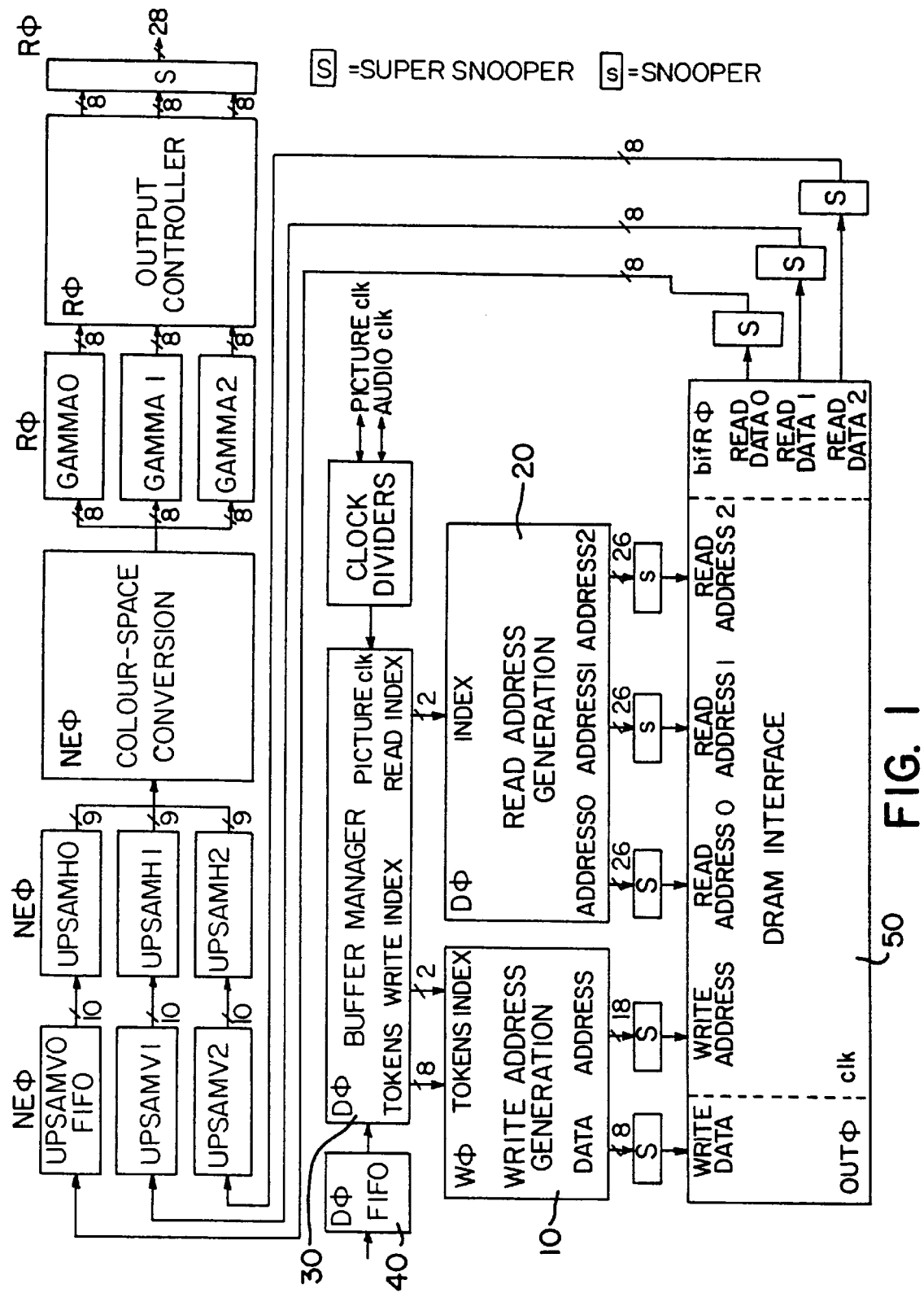
FIG. 1 is a block diagram of an image formatter.

Before one embodiment of the invention is explained in detail, it is to be understood that the invention is not limited in its application to the details of construction and the arrangement of components set forth in the following description or illustrated in the drawings. The invention is capable of other embodiments and of being practiced or carried out in various ways. Also, it should be understood that the phraseology and terminology used herein is for the purpose of description and should not be regarded as limiting.

DETAILED DESCRIPTION OF THE INVENTION

An image formatter is shown in FIG. 1. There are two address generators, one for writing 10 and one for reading 20, a buffer manager 30 which supervises the two address generators 10 and 20 and provides frame-rate conversion, a data processing pipeline including vertical and horizontal upsamplers, colour-space conversion and gamma correction, and a final control block which regulates the output of the processing pipeline.

Tokens arriving at the input to the image formatter are buffered in the FIFO 40 and transferred into the buffer manager 30. This block detects the arrival of new pictures and determines the availability of a buffer in which to store each one. If there is a buffer available, it is allocated to the arriving picture and its index is transferred to the write address generator 10. If there is no buffer available, the incoming picture will be stalled until one does become free. All tokens are passed on to the write address generator 10. This operation is described in greater detail in U.K. Serial No. 9405914.4 filed on Mar. 24, 1994, which is incorporated herein by reference.

Each time the read address generator 20 receives a VSYNC signal from the display system, a request is made to the buffer manager 30 for a new display buffer index. If there is a buffer containing complete picture data, and that picture is deemed to be ready for display, that buffer's index will be passed to the display address generator. If not, the buffer manager sends the index of the last buffer to be displayed. At start-up, zero is passed as the index until the first buffer is full. A picture is deemed to be ready for display if its number (calculated as each picture is input) is greater than or equal to the picture number which is expected at the display (presentation number) given the encoding frame rate. The expected picture number is determined by counting picture clock pulses, where picture clock can be generated either locally by the clock dividers, or externally. This technology allows frame-rate conversion (e.g. 2-3 pulldown).

External DRAM is used for the buffers, which can be either two or three in number. Three are necessary if frame-rate conversion is to be effected.

The purpose of the buffer manager 30 is to supply the address generators with indices indicating any of either two or three external buffers for writing and reading of picture data. The allocation of these indices is influenced by three principal factors, each representing the effect of one of the timing regimes in operation: the rate at which picture data arrives at the input to image formatter (coded data rate), the rate at which data is displayed (display data rate), and the frame rate of the encoded video sequence (presentation rate).

A three-buffer system enables the presentation rate and the display rate to differ (e.g. 2-3 pulldown), so that frames are either repeated or skipped as necessary to achieve the best possible sequence of frames given the timing constraints of the system. Pictures which present some difficulty in decoding may also be accommodated in a similar way, so that if a picture takes longer than the available display time to decode, the previous frame will be repeated while everything else 'catches up'. In a two-buffer system the three timing regimes must be locked—it is the third buffer which provides the flexibility for taking up slack.

The buffer manager operates by maintaining certain status information associated with each external buffer—this includes flags indicating if the buffer is in use, full of data, or ready for display, and the picture number within the sequence of the picture currently stored in the buffer. The presentation number is also recorded, this being a number which increments every time a picture clock pulse is received, and represents the picture number which is currently expected for display based on the frame rate of the encoded sequence.

An arrival buffer (a buffer to which incoming data will be written) is allocated every time a PICTURE_START token is detected at the input, and this buffer is then flagged as IN_USE; on PICTURE_END, the arrival buffer will be de-allocated (reset to zero) and the buffer flagged as either FULL or READY depending on the relationship between the picture number and the presentation number.

The display address generator requests a new display buffer, once every vsync, via a two-wire-interface. If there is a buffer flagged as READY, then that will be allocated to display by the buffer manager. If there is no READY buffer, the previously displayed buffer will be repeated.

Each time the presentation number changes this is detected and every buffer containing a complete picture is tested for READY-ness by examining the relationship between its picture number and the presentation number. Buffers are considered in turn, and when any is deemed to be READY this automatically cancels the READY-ness of any which was previously flagged as READY, this then being flagged as EMPTY. This works because later picture numbers are stored, by virtue of the allocation scheme, in the buffers that are considered later.

TEMPORAL_REFERENCE tokens in H261 cause a buffer's picture number to be modified if skipped pictures in the input stream are indicated. TEMPORAL_REFERENCE tokens in MPEG have no effect.

A FLUSH token causes the input to stall until every buffer is either EMPTY or has been allocated as the display buffer; presentation number and picture number are then reset and a new sequence can commence.

All data is input to the buffer manager from the input fifo, bm_front. This transfer takes place via a two-wire interface, the data being 8 bits wide plus an extension bit. All data arriving at the buffer manager is guaranteed to be complete tokens, a necessity for the continued processing of presentation numbers and display buffer requests in the event of significant gaps in the data upstream.

Tokens (8 bit data, 1 bit extension) are transferred to the write address generator via a two-wire interface. The arrival buffer index is also transferred on the same interface, so that the correct index is available for address generation at the same time as the PICTURE_START token arrives at waddrgen.

The interface to the read address generator comprises two separate two-wire interfaces which can be considered to act as 'request' and 'acknowledge' signals respectively—single wires are not adequate, however, because of the two two-wire-based state machines at either end.

The sequence of events normally associated with the dispaddr interface is as follows: dispaddr invokes a request, in response to a vsync from the display device, by asserting the drq_valid input to the buffer manager; when the buffer manager reaches an appropriate point in its state machine it will accept the request and go about allocating a buffer to be displayed; the disp_valid wire is then asserted, the buffer index is transferred, and this will normally be accepted immediately by dispaddr. There is an additional wire associated with this last two-wire-interface (rst_fld) which indicates that the field number associated with the current index must be reset regardless of the previous field number.

The buffer manager block uses four bits of microprocessor address space, together with the 8-bit data bus and read and write strobes. There are two select signals, one indicating user-accessible locations and the other indicating test locations which should not require access under normal operation conditions.

The buffer manager is capable of producing two different events: index found and late arrival. The first of these is asserted when a picture arrives whose PICTURE_START extension byte (picture index) matches the value written into the BU_BM_TARGET_IX register at setup. The second event occurs when a display buffer is allocated whose picture number is less than the current presentation number, i.e. the processing in the system pipeline up to the buffer manager has not managed to keep up with the presentation requirements.

Picture clock is the clock signal for the presentation number counter and is either generated on-chip or taken from an external source (normally the display system). The buffer manager accepts both of these signals and selects one based on the value of pclk_ext (a bit in the buffer manager's control register). This signal also acts as the enable for the pad picoutpad, so that if the Image Formatter is generating its own picture clock this signal is also available as an output from the chip.

Figure 2:
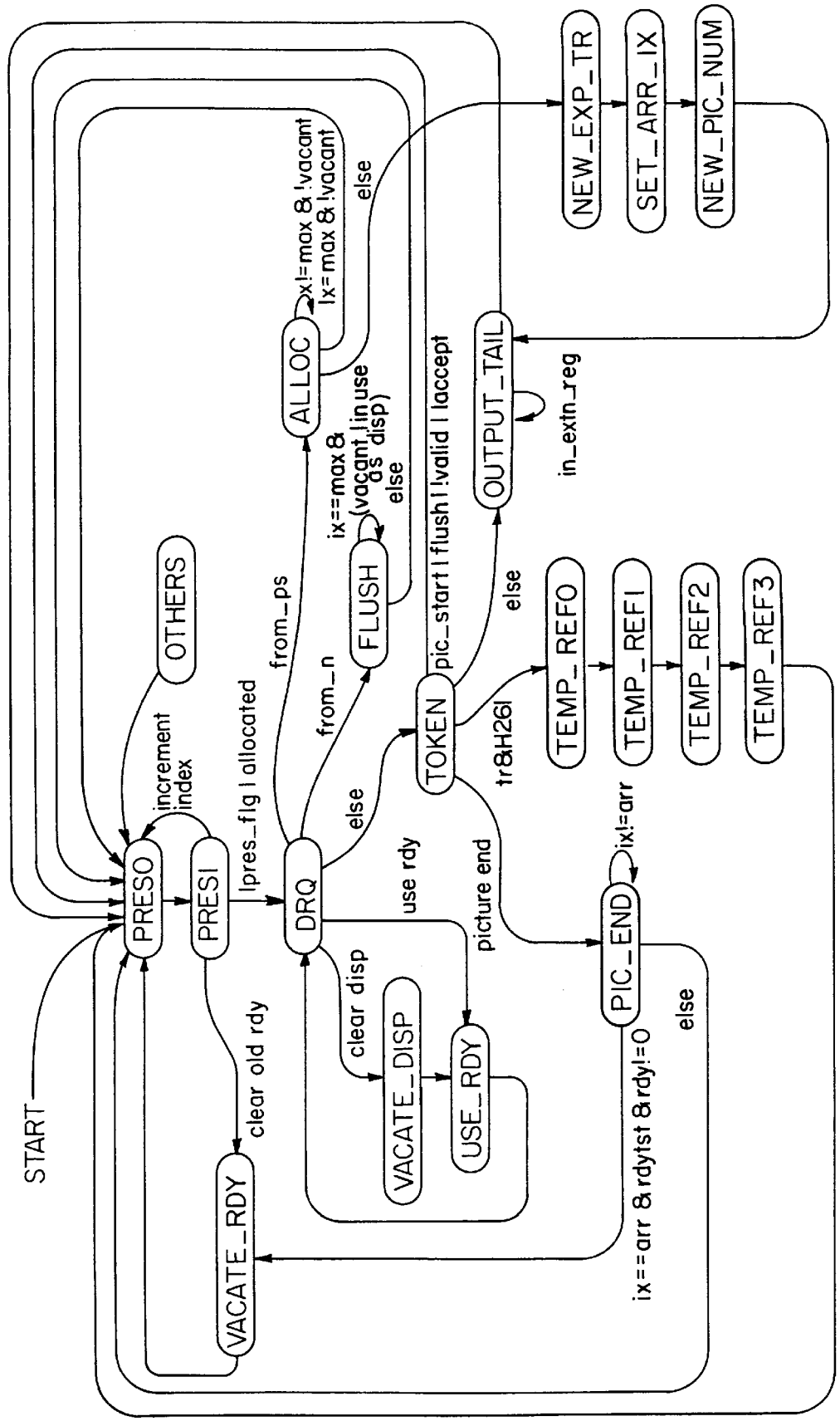
FIG. 2 is a diagram of the buffer manager state machine.

There are 19 states in the buffer manager's state machine. These interact as shown in FIG. 2. The reset state is PRES0, with flags set to zero such that the main loop is circulated initially.

Figure 3:
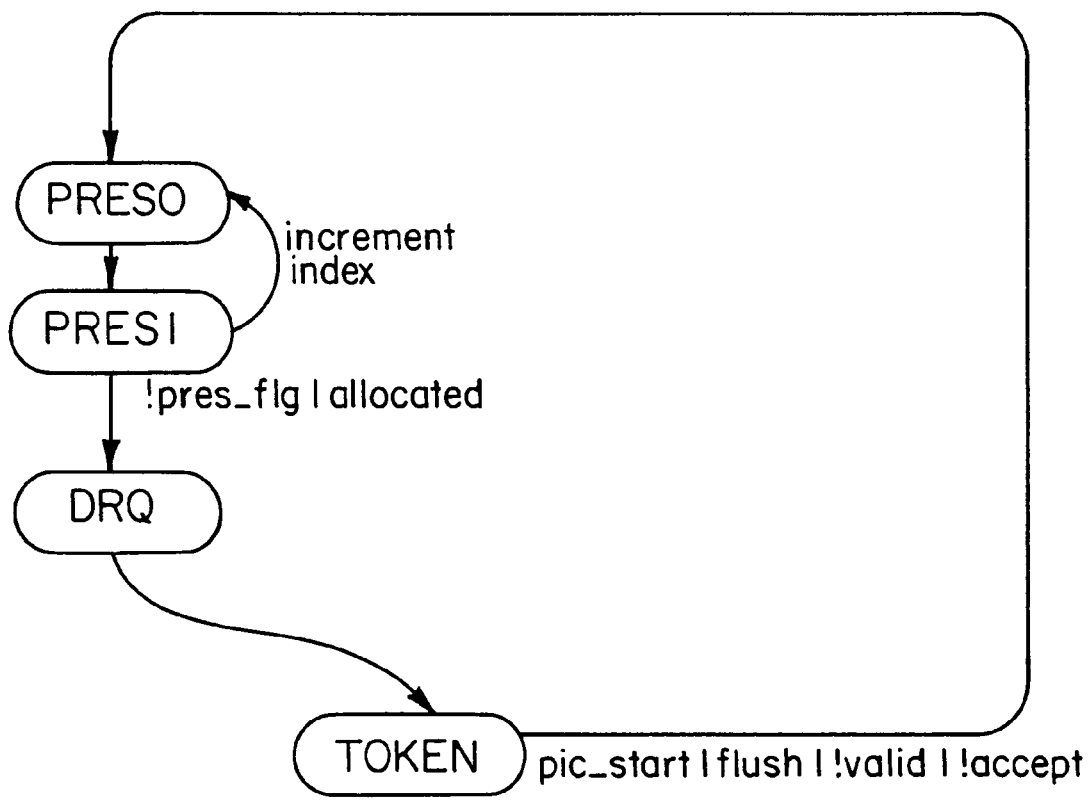
FIG. 3 illustrates the main loop of the state machine in FIG. 2.

The main loop of the state machine comprises the states shown in FIG. 3 (highlighted in the main diagram—FIG. 2). States PRES0 and PRES1 are concerned with detecting a picture clock via the signal presflg. Two cycles are allowed for the tests involved since they all depend on the value of rdytst. If a presentation flag is detected, all of the buffers are examined for possible 'readiness', otherwise the state machine just advances to state DRQ. Each cycle around the PRES0–PRES1 loop examines a different buffer, checking for full and ready conditions: if these are met, the previous ready buffer (if one exists) is cleared, the new ready buffer is allocated and its status is updated. This process is repeated until all buffers have been examined (index==max buf) and the state then advances. A buffer is deemed to be ready for display when any of the following is true:

(pic_num>pres_num)&&((pic_num−pres_num)>= 128)

or (pic_num<pres_num)&&((pres_num−pic_num)<= 128)

or pic_num==pres_num

State DRQ checks for a request for a display buffer (drq_valid_reg && disp_acc_reg). If there is no request the state advances (normally to state TOKEN—more on this later), otherwise a display buffer index is issued as follows: if there is no ready buffer, the previous index is re-issued or, if there is no previous display buffer, a null index (zero) is issued; if a buffer is ready for display, its index is issued and its state is updated—if necessary the previous display buffer is cleared. The state machine then advances as before.

State TOKEN is the usual option for completing the main loop: if there is valid input and the output is not stalled, tokens are examined for strategic values (described in later sections), otherwise control returns to state PRES0.

Control only diverges from the main loop when certain conditions are met. These are described in the following sections.

If during the PRES0–PRES1 loop a buffer is determined to be ready, any previous ready buffer needs to be vacated because only one buffer can be designated ready at any time. State VACATE_RDY clears the old ready buffer by setting its state to VACANT, and it resets the buffer index to 1 so that when control returns to the PRES0 state, all buffers will be tested for readiness. The reason for this is that the index is by now pointing at the previous ready buffer (for the purpose of clearing it) and there is no record of our intended new ready buffer index—it is necessary therefore to re-test all of the buffers.

Allocation of the display buffer index takes place either directly from state DRQ (state USE_RDY) or via state VACATE_DISP which clears the old display buffer state. The chosen display buffer is flagged as IN_USE, the value of rdy_buf is set to zero, and the index is reset to 1 to return to state DRQ. disp_buf is given the required index and the two-wire interface wires (disp_valid and drq_acc) are controlled accordingly. Control returns to state DRQ only so that the decision between states TOKEN, FLUSH and ALLOC does not need to be made in state USE_RDY.

On receipt of a PICTURE_END token control transfers from state TOKEN to state PICTURE_END where, if the index is not already pointing at the current arrival buffer, it is set to point there so that its status can be updated. Assuming both out_acc_reg and en_full are true, status can be updated as described below; if not, control remains in state PICTURE_END until they are both true. The en_full signal is supplied by the write address generator to indicate that the swing buffer has swung, i.e. the last block has been successfully written and it is therefore safe to update the buffer status.

The just-completed buffer is tested for readiness and given the status either FULL or READY depending on the result of the test. If it is ready, rdy_buf is given the value of its index and the set_la_ev signal (late arrival event) is set high (indicating that the expected display has got ahead in time of the decoding). The new value of arr_buf now becomes zero, and, if the previous ready buffer needs its status clearing, the index is set to point there and control moves to state VACATE_RDY; otherwise index is reset to 1 and control returns to the start of the main loop.

When a PICTURE_START token arrives during state TOKEN, the flag from_ps is set, causing the basic state machine loop to be changed such that state ALLOC is visited instead of state TOKEN. State ALLOC is concerned with allocating an arrival buffer (into which the arriving picture data can be written), and cycles through the buffers until it finds one whose status is VACANT. A buffer will only be allocated if out_acc_reg is high, since it is output on the data two-wire-interface, so cycling around the loop will continue until this is the case. Once a suitable arrival buffer has been found, the index is allocated to arr_buf and its status is flagged as IN_USE. Index is set to 1, the flag from_ps is reset, and the state is set to advance to NEW_EXP_TR. A check is made on the picture's index (contained in the word following the PICTURE_START) to determine if it the same as targ_ix (the target index specified at setup) and, if so, set_if_ev (index found event) is set high.

The three states NEW_EXP_TR, SET_ARR_IX and NEW_PIC_NUM set up the new expected temporal reference and picture number for the incoming data—the middle state just sets the index to be arr_buf so that the correct picture number register is updated (note that this_pnum is also updated). Control then goes to state OUTPUT_TAIL which outputs data (assuming favourable two-wire interface signals) until a low extension is encountered, at which point the main loop is re-started. This means that whole data blocks (64 items) are output, within which there are no tests for presentation flag or display request.

A FLUSH token in the data stream indicates that sequence information (presentation number, picture number, rst_fld) should be reset. This can only happen when all of the data leading up to the FLUSH has been correctly processed and so it is necessary, having received a FLUSH, to monitor the status of all of the buffers until it is certain that all frames have been handed over to the display, i.e. all but one of the buffers have status EMPTY, and the other is IN_USE (as the display buffer). At that point a 'new sequence' can safely be started.

When a FLUSH token is detected in state TOKEN, the flag from_fl is set, causing the basic state machine loop to be changed such that state FLUSH is visited instead of state TOKEN. State FLUSH examines the status of each buffer in turn, waiting for it to become VACANT or IN_USE as display. The state machine simply cycles around the loop until the condition is true, then increments its index and repeats the process until all of the buffers have been visited. When the last buffer fulfils the condition, presentation number, picture number and all of the temporal reference registers assume their reset values; rst_fld is set to 1. The flag from_fl is reset and the normal main loop operation is resumed.

When a TEMPORAL_REFERENCE token is encountered, a check is made on the H261 bit and, if set, the four states TEMP_REF0 to TEMP_REF3 are visited. These perform the following operations:

TEMP_REF0: temp_ref=in_data_reg;

TEMP_REF1: delta=temp_ref−exp_tr; index=arr_buf;

TEMP_REF2: exp_tr=delta+exp_tr;

TEMP_REF3: pic_num[i]=this_pnum+delta;index=1;

State TOKEN passes control to state OUTPUT_TAIL in all cases other than those outlined above. Control remains here until the last word of the token is encountered (in_extn_reg is low) and the main loop is then re-entered.

The requirement to repeatedly check for the 'asynchronous' timing events of picture clock and display buffer request, and the necessary to have the buffer manager input stalled during these checks, means that when there is a continuous supply of data at the input to the buffer manager there will be a restriction on the data rate through the buffer manager. A typical sequence of states may be PRES0, PRES1, DRQ, TOKEN, OUTPUT_TAIL, each, with the exception of OUTPUT_TAIL, lasting one cycle. This means that for each block of 64 data items, there will be an overhead of 3 cycles during which the input is stalled (during states PRES0, PRES1 and DRQ) thereby slowing the write rate by 3/64 or approximately 5%. This number may occasionally increase to up to 13 cycles overhead when auxiliary branches of the state machine are executed under worst-case conditions. Note that such large overheads will only apply on a once-per-frame basis.

Presentation number free-runs during upi accesses; if presentation number is required to be the same when access is relinquished as it was when access was gained, this can be effected by reading presentation number after access is granted, and writing it back just before it is relinquished. Note that this is asynchronous, so it may be necessary to repeat the accesses several times to be sure they are effective.

The write address generator 10 receives tokens from the buffer manager 30 and detects the arrival of each new DATA token. As each arrives, it calculates a new address for the DRAM interface 50 in which to store the arriving block. The raw data is then passed to the DRAM interface 50 where it is written in to a swing buffer. Note that DRAM addresses are block addresses, and pictures in the DRAM are organised as rasters of blocks. Incoming picture data, however, is organised as sequences of macroblocks, so the address generation algorithm must take account of this.

We claim:

1. A method of formatting images comprising frames of video data comprising the steps of:
   receiving video data as tokens having a frame rate and an arrival rate;
   defining at least three buffers for storage of the data, one of said buffers being a display buffer, and another of said buffers being an arrival buffer;
   generating write addresses for storing data in said buffers;
   generating read addresses for reading data stored in said buffers;
   responsive to said step of generating read addresses, displaying data from said display buffer at a display rate; and
   responsive to said arrival rate, said display rate, and said frame rate, allocating said buffers to accommodate said steps of generating write addresses and generating read addresses;
   defining a plurality of 2-wire interfaces each comprising: a sender, a receiver, and a clock connected to said sender and said receiver, said clock having transitions from a first state to a second state, wherein data is transferred from said sender to said receiver upon a clock transition only when said sender is ready and said receiver is ready;
   providing control signals for controlling said steps of generating write addresses, generating read addresses, and allocating said buffers, wherein said control signals are communicated via said 2-wire interfaces.

2. The method according to claim 1, wherein said video data is received via a said 2-wire interface.

3. The method according to claim 1, wherein said tokens each comprise a plurality of data words, said data words each including an extension bit which indicates a presence of additional words in said token.

4. The method according to claim 1, further comprising the steps of:
   maintaining a setup register having a picture index stored therein;
   asserting a first signal when received encoded data represents a picture having an index corresponding to said picture index; and
   asserting a second signal when said display buffer has a picture number that is less than a current presentation number.

5. A method of formatting images comprising frames of video data comprising the steps of:
   receiving video data as tokens having a frame rate and an arrival rate;
   defining at least three buffers for storage of the data, one of said buffers being a display buffer, and another of said buffers being an arrival buffer;
   generating write addresses for storing data in said buffers;
   generating read addresses for reading data stored in said buffers;
   responsive to said step of generating read addresses, displaying data from said display buffer at a display rate; and
   responsive to said arrival rate, said display rate, and said frame rate, allocating said buffers to accommodate said steps of generating write addresses and generating read addresses;
   counting presentation numbers of said frames; and
   responsive to said arrival rate, said display rate, and said frame rate, allocating said buffers to accommodate said steps of generating write addresses and generating read addresses by the steps of:
   in a first state PRES0, and in a second state PRES1, evaluating conditions of said buffers;
   in a third state DRQ evaluating a pending request for said display buffer; and
   in a fourth state TOKEN, examining tokens of received data.

6. The method according to claim 5, wherein said step of allocating said buffers further comprises the step of:
   in a fifth state VACATE_RDY, clearing a ready state of a said buffer.

7. The method according to claim 5, wherein said step of allocating said buffers further comprises the step of:
   in a sixth state VACATE_DISP, clearing a state of said display buffer.

8. The method according to claim 5, wherein said step of allocating said buffers further comprises the step of:
   in a seventh state USE_RDY, allocating a display buffer.

9. The method according to claim 5, wherein said step of allocating said buffers further comprises the step of:
   in an eighth state PICTURE_END, setting an index to a current arrival buffer.

10. The method according to claim 5, wherein said step of allocating said buffers further comprises the step of:
    in a ninth state ALLOC, allocating an arrival buffer for new data.

11. The method according to claim 5, wherein said step of allocating said buffers further comprises the step of:

in a tenth state NEW_EXP, and in an eleventh state NEW_PIC_NUM, setting up an expected temporal reference and picture number for incoming data.

12. The method according to claim 5, wherein said step of allocating said buffers further comprises the step of:

in a twelfth state SET_ARR_IX, updating a picture number register.

13. The method according to claim 5, wherein said step of allocating said buffers further comprises the step of:

in a thirteenth state OUTPUT_TAIL, outputting data from said display buffer.

14. The method according to claim 5, wherein said step of allocating said buffers further comprises the step of:

in a fourteenth state FLUSH, delaying until said buffers become vacant or enter a state of use for display.

15. The method according to claim 5, further comprising the steps of:

defining a plurality of 2-wire interfaces each comprising: a sender, a receiver, and a clock connected to said sender and said receiver, said clock having transitions from a first state to a second state, wherein data is transferred from said sender to said receiver upon a clock transition only when said sender is ready and said receiver is ready;

providing control signals for controlling said steps of generating write addresses, generating read addresses, and allocating said buffers, wherein said control signals are communicated via said 2-wire interfaces.

16. The method according to claim 5, wherein said tokens each comprise a plurality of data words, said data words each including an extension bit which indicates a presence of additional words in said token.

* * * * *